United States Patent Office 2,819,306
Patented Jan. 7, 1958

2,819,306

PREPARATION OF FORMAMIDES BY REACTING HYDROGEN CYANIDE WITH CYCLOHEXENE

Harry E. Albert, Akron, Ohio, assignor to The Firestone Tire & Rubber Company, Akron, Ohio, a corporation of Ohio No Drawing. Application September 14, 1953
Serial No. 380,087

2 Claims. (Cl. 260—561)

This invention relates to an improved method of preparing N-substituted formamides by reacting a secondary olefin with hydrocyanic acid.

It has previously been proposed to react various olefins with hydrogen cyanide in the presence of an equimolecular proportion of substantially anhydrous sulfuric acid or other cationoid substance. However, it has been found that when this reaction is applied to secondary olefins, that is, olefins other than ethylene in which at least one hydrogen atom is attached to each ethylenic carbon atom, low yields of less than 50% of the desired formamide are produced. Accordingly, it is an object of the invention to provide an improved method of producing substituted formamides by reacting hydrogen cyanide with secondary olefins to produce the desired material in high yields and in substantially pure form. Other objects of the invention will be apparent in the description of the invention which follows.

Unexpectedly, it has been found that yields of the desired formamide are tremendously improved by reacting a secondary olefin with hydrogen cyanide in the presence of aqueous sulfuric acid containing 7 to 13% water rather than in the presence of anhydrous sulfuric acid or the substantially anhydrous 96% sulfuric acid of commerce. Furthermore it has been found that more than the usual equimolecular proportion of sulfuric acid is desirable in order to produce high yields. At least 1.5 moles, and preferably substantially 2 moles, of sulfuric acid must be present for each mole of the olefin in order to produce maximum yields of the formamide, based upon the olefin used. Also it has been found that slightly more than one mole of hydrogen cyanide per mole of the olefin improves the yields of the formamide.

The reactions involved in the present invention are believed to be in accordance with the following equations:

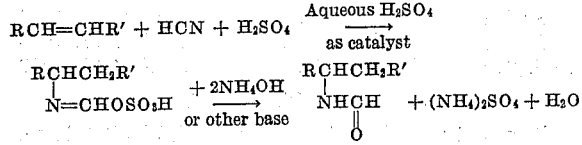

in which R is hydrogen or a hydrocarbon radical and R' is a hydrocarbon radical, or R and R' are combined as a divalent hydrocarbon radical.

Preferred conditions for carrying out the reaction of the invention are, as indicated above, to utilize one mole of the secondary olefin, one mole or slightly more than one mole of hydrogen cyanide and at least about 1.5 moles of aqueous sulfuric acid containing 7–13% water. The indicated overall excess of hydrogen cyanide need not be more than about 0.25 mole, that is, up to 25% excess. More than this amount of hydrogen cyanide is not advantageous, but the use of no excess hydrogen cyanide results in lower yields of the desired formamide. A preferred procedure involves mixing a mole of the secondary olefin with diluted sulfuric acid to the extent of one mole of the acid, adding an additional one mole of concentrated sulfuric acid and then gradually adding slightly more than one mole of hydrogen cyanide to the cooled reaction mixture. As an alternative, the water is mixed with the olefin, and then two moles of concentrated sulfuric acid are added. The total water added during such procedure is calculated to produce a concentration of 7–13% water in the sulfuric acid solution. Although the hydrogen cyanide may be added to the olefin initially and then sulfuric acid added to that mixture, it has been found that better yields are obtained when the olefin and acid plus water are initially mixed and then the hydrogen cyanide is gradually introduced to the mixture.

At the conclusion of the introduction of hydrogen cyanide to the mixture and the reaction of hydrogen cyanide with the olefin, the desired formamide is produced by reacting the mixture with an alkaline material, such as sodium hydroxide, aqueous sodium carbonate, ammonium hydroxide or other basic material. A preferred feature of the invention involves neutralizing the reaction mixture with aqueous ammonia, separating the ammonium sulfate solution from the organic liquid and subsequently recovering ammonium sulfate from the solution. An organic solvent, such as benzene, toluene, gasoline, petroleum ether or hexane, can be introduced into the reaction mixture either during the reaction or during the resulting neutralization step (or can be omitted).

The secondary olefins to which the invention is applied are the secondary cycloalkenes. Examples of suitable secondary olefins are cyclohexene, cyclopentene, 3-methylcyclopentene, 3-methylcyclohexene, 4-methylcyclohexene and cyclooctene.

It is preferred to mix all of the reagents together at a temperature of approximately 30 to 40° C. in order to insure a smooth reaction. If the hydrogen cyanide is added to the acid-olefin mixture at much lower temperatures, say 10 to 15° C., some danger may be involved; the reaction rate at these lower temperatures is so low that a substantial concentration of unreacted reagents may build up, and since the reaction is exothermic, the reaction can get out of control later on. Reaction temperatures of as high as 120° C. have been successfully employed.

Various methods of carrying out the invention are illustrated in the following examples, which are not to be construed as limiting the invention.

EXAMPLE 1

N-cyclohexyl formamide

In a 500 ml. three neck flask provided with a thermometer, a reflux condenser, a sealed electric stirrer, a standard addition funnel and an addition funnel having a reflux condenser cooled with 10° C. water, there was placed 43 grams (0.5 mole) of 95% cyclohexene. The electric stirrer was turned on, and 51 grams (0.5 mole) of concentrated (96%) sulfuric acid diluted with 7 grams of water (concentration of water in the acid=15.5%) was added through the standard addition funnel over a 15 minute period, the reaction temperature being maintained at 10–15° C. by ice bath cooling. An additional 51 grams of 96% sulfuric acid was then added over a 15 minute period at 10–15° C., bringing the final concentration of water to 10.1%. Liquid hydrogen cyanide (16.4 grams=0.61 mole) was added through the addition funnel provided with a reflux condenser over a half hour period, mostly at 30–40° C. After completion of the addition, the reaction mixture was stirred at 35–40° C. for fifteen minutes and then heated to 90° C. The reaction mixture was allowed to stand overnight, then was poured over ice, made alkaline with sodium hydroxide and extracted with ether. The ether solution was dried over anhydrous sodium carbonate, the ether was evaporated, and the residue was vacuum-distilled. The product was taken at 150–158° C. at 18 mm. and weighed 60.8 grams (95.8% of the theoretical yield of 63.5 grams). The product solidified on standing.

EXAMPLE 2

N-cyclohexyl formamide

In the apparatus described in Example 1, one mole of sulfuric acid (102 grams of 96% acid plus 7 grams of water, concentration of water=10%) was added to 43 grams (0.5 mole) of 95% cyclohexene at 10–15° C. over a 15 minute period. The reaction was allowed to warm to 20° C. (1 hour) and then 17.4 grams (0.64 mole) of liquid hydrogen cyanide was added over a half hour period, mostly at 30–40° C. The reaction mixture was stirred 15 minutes at 35–40° C., and then heated to 90° C. The contents of the reaction flask were cooled to 30° C. and poured over ice. The product was isolated as in Example 1. The yield was 56.0 grams (88.2%).

EXAMPLE 3

N-cyclohexyl formamide

To a mixture of 43 grams (0.5 mole) of 95% cyclohexene and 7 grams of water, there was added 102 grams (1 mole) of 95% sulfuric acid at 10–15° C. over a one hour period during cooling in an ice bath (concentration of water in the aqueous acid=10%). Addition of 16.4 grams (0.61 mole) of liquid hydrogen cyanide was then started. This addition required one-half hour and most of the addition was carried out at 30–40° C. After completion of the addition the reaction mixture was stirred at 35–40° C. for 15 minutes and then heated to 90° C. The reaction mixture was allowed to stand overnight, and then 150 ml. of concentrated aqueous ammonia and 100 ml. of water were added at 30–50° C. during cooling in an ice bath to make the reaction mixture alkaline. The organic layer was separated (67 grams), and the aqueous layer was washed once with ether. The ether extract and the organic layer were combined and dried over anhydrous sodium carbonate. The ether was removed, and the residue was distilled under reduced pressure. The product was taken at 150–158° C. at 18 mm. It weighed 60.7 grams, 95.7% of the theoretical yield of 63.5 grams.

EXAMPLE 4

N-cyclohexyl formamide

One mole of aqueous sulfuric acid (102 grams of 96% acid plus 7 grams of water, concentration of water in the aqueous acid=10%) was added to a mixture of 43 grams (0.5 mole) of 95% cyclohexene and 13.9 grams (0.51 mole) of liquid hydrogen cyanide, at 10–15° C. over an hour period. The reaction mixture was heated to 90° C. The reaction mixture was allowed to stand overnight, and then it was poured over water and the product isolated as in Example 1. The yield was 51.8 grams (81.7%).

EXAMPLE 5

N-cyclohexyl formamide

Example 4 was repeated, except that one mole of aqueous sulfuric acid containing 13% water was used (102 grams of 96% acid plus 10.5 grams of water). The yield was 50.1 grams (79.0%).

EXAMPLE 6

N-cyclohexyl formamide

Example 4 was repeated, except that 1.25 moles of sulfuric acid containing 7% water was used (128 grams of 96% sulfuric acid plus 3.7 grams of water). The yield was 50.4 grams (79.4%) of N-cyclohexylformamide.

Several examples illustrate one of the preferred procedures of the invention: adding a mole of the secondary olefin to a mole of aqueous sulfuric acid containing 10 to 20% by weight water, adding concentrated sulfuric acid to bring the water concentration in the aqueous acid within the range of 7 to 13% by weight, and then adding hydrogen cyanide.

A variation on the specific process of the invention described above involves adding a portion of the water to the reaction mixture along with the hydrogen cyanide. However, the aqueous sulfuric acid (mixed with olefin) to which the hydrogen cyanide is added should contain at least 7% water at the time the cyanide addition is started.

In like manner, other secondary olefins including the ones recited above can be successfully substituted for cyclohexene of the examples.

What is claimed is:

1. Method of producing N-cyclohexyl formamide which includes reacting one mole of cyclohexene with slightly more than one mole of hydrogen cyanide in the presence of 1.5 to 2.5 moles of aqueous sulfuric acid containing 7 to 13% water, the HCN being gradually added to a mixture of the cyclohexene and the aqueous acid, thereafter heating the reaction mixture to approximately 90° C., and then neutralizing the resulting reaction product.

2. Improved method of producing high yields of N-cyclohexyl formamide which includes mixing at approximately 10 to 15° C. one mole of cyclohexene with water and at least 1.5 moles of sulfuric acid, the water being sufficient to produce an aqueous sulfuric acid containing 7 to 13% water, and then gradually adding at approximately 30 to 40° C. slightly more than one mole of hydrocyanic acid to the mixture, thereafter heating the reaction mixture to approximately 90° C., and then neutralizing the resulting reaction product.

References Cited in the file of this patent

UNITED STATES PATENTS

| | | |
|---|---|---|
| 2,457,660 | Gresham et al. | Dec. 28, 1948 |
| 2,573,673 | Ritter | Oct. 30, 1951 |
| 2,620,327 | Albisetti | Dec. 2, 1952 |
| 2,626,959 | Chenicek | Jan. 27, 1953 |
| 2,632,022 | Bortnick | Mar. 17, 1953 |
| 2,632,023 | Bortnick | Mar. 17, 1953 |
| 2,653,975 | Mowry et al. | Sept. 29, 1953 |

OTHER REFERENCES

Ritter et al.: "J. Am. Chem. Soc.," vol. 70 (1948), pp. 4045–50.